US007817681B2

(12) United States Patent
Kuksenkov et al.

(10) Patent No.: US 7,817,681 B2
(45) Date of Patent: Oct. 19, 2010

(54) PULSE STRETCHING OPTICAL FIBER AND RELATED SYSTEMS AND METHODS

(75) Inventors: Dmitri Vladislavovich Kuksenkov, Painted Post, NY (US); Shenping Li, Painted Post, NY (US); William Allen Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 187 days.

(21) Appl. No.: 12/215,257

(22) Filed: Jun. 26, 2008

(65) Prior Publication Data

US 2009/0323735 A1     Dec. 31, 2009

(51) Int. Cl.
    *H01S 3/30* (2006.01)
(52) U.S. Cl. .............................................. 372/6; 372/8
(58) Field of Classification Search ................ 372/25, 372/6; 385/127, 123; 359/333
    See application file for complete search history.

(56) References Cited

U.S. PATENT DOCUMENTS

| | | | |
|---|---|---|---|
| 5,400,350 A | | 3/1995 | Galvanauskas |
| 5,513,194 A | | 4/1996 | Tamura et al. |
| 6,321,016 B1 | * | 11/2001 | Tirloni et al. ............... 385/127 |
| 6,885,683 B1 | | 4/2005 | Fermann et al. |
| 6,922,514 B2 | * | 7/2005 | Tirloni et al. ............... 385/127 |
| 6,956,887 B2 | * | 10/2005 | Jiang et al. ..................... 372/99 |
| 7,414,780 B2 | * | 8/2008 | Fermann et al. ............. 359/337 |
| 7,486,436 B1 | * | 2/2009 | Kuksenkov et al. ......... 359/333 |

OTHER PUBLICATIONS

Parton, J.R. "Improvements in the Variable Aperture Method for Measuring the Mode-Field Diameter of a Disperson-Shifted Fiber," Journal of Lightwave Technology; vol. 7, No. 8, Aug. 1989 (pp. 1158-1161).
Shah, L., Liu, I. Hartl, G. Imeshev, G. C. Cho, and M.E. Fermann, entitled "High energy femtosecond Yb cubicon fiber amplifier," Optics Express 13, No. 12 (Jun. 13, 2005).
A.C. Peacock, R.J. Kruhlak, J.D. Harvey and J.M. Dudley, "Solitary pulsve propagation in high gain optical fiber amplifiers with normal group velocity dispersion," Optics Comm., V. 206, pp. 171-177 (2002).
I. Hartl, G. Imeshev, L. Dong, G.C. Cho, M.E. Fermann, entitled "Ultra-compact dispersion compensated femtosecond fiber oscillators and amplifiers," 2005 Conference on Lasers and Electro-Optics, CLEO, v.3, p. 1641-1643 (2005).

* cited by examiner

*Primary Examiner*—Minsun Harvey
*Assistant Examiner*—Tuan N. Nguyen
(74) *Attorney, Agent, or Firm*—Matthew B. McNutt

(57) ABSTRACT

An optical fiber for performing pulse stretching, and fiber laser systems and methods using the pulse-stretching fiber are disclosed. The pulse-stretching (PS) fiber has low fourth-order dispersion (dispersion curvature) and a third order dispersion (dispersion slope) with a small negative, nearly zero or small positive value. Two different types of fiber laser systems that use the PS fiber in a manner that achieves optimum performance are described. The PS fiber enables an all-fiber (up to the final pulse compressor) ultra-short pulsed laser systems reaching pulse energies exceeding 100 µJ, average powers exceeding 100 W, and output pulse widths of less than 100 fs.

19 Claims, 10 Drawing Sheets

PULSE STRETCHING OPTICAL FIBER AND RELATED SYSTEMS AND METHODS

FIELD

The present disclosure relates generally to optical fibers used in fiber lasers, and in particular relates to pulse stretching in optical fiber lasers to produce stretched optical pulses that are then compressed to form ultra-short output pulses.

BACKGROUND

Ultra-short pulsed fiber laser systems ("fiber lasers") present an attractive alternative to their solid-state analogues. One obvious advantage is size; an optical fiber can be easily coiled with a small diameter. Another advantage is efficiency. Fiber lasers based on Yb-doped fiber operating in the 1030-1100 nm spectral range can be very efficiently pumped with inexpensive, reliable and high-brightness 980 nm laser diodes. Yet another advantage is the beam quality at high power that results because the optical fibers in the system can be designed to support only the fundamental waveguide mode. This provides a nearly Gaussian output beam for average powers up to 100 W and above, with several kW of output power demonstrated in single-mode continuous-wave (CW) fiber lasers. Another important advantage of fiber lasers is their greatly simplified assembly and maintenance. Parts of the system can be optically coupled by fusion splicing, which obviates the need for fiber re-alignment.

A major obstacle that limits the amount of power in a high-output pulsed fiber laser is nonlinear distortion of the optical pulses. While non-linear effects can be reduced by increasing the fiber core size, the core size cannot be increased indefinitely without making the fiber multimode, which would eliminate the high beam quality advantage associated with single-mode operation, and would cause the unrecoverable broadening of the laser pulses due to the mode dispersion in multimode fiber. Amplifying the light pulses to a high energy (and therefore a high peak power) produces significant spectral broadening due to a nonlinear effect known as "self-phase modulation" that, when coupled with chromatic dispersion, causes an unrecoverable change of the pulse shape.

To avoid such non-linearities, in practical fiber lasers the pulses are usually "stretched" by passing them through a highly dispersive element (e.g., a delay line) prior to amplification, so that the peak power and therefore the amount of self-phase modulation is greatly reduced. Amplification of light pulses to an energy exceeding 1 mJ in a fiber amplifier with subsequent high-quality compression back to ~400 fs duration has been demonstrated and shown to require stretching to >1 ns even for the fiber amplifier with the fiber core diameter as large as 50 µm. The pulse stretching is commonly accomplished using non-fiber (i.e., external) bulk diffraction grating, which requires that the light be taken out of the fiber, passed through a number of bulk optic elements (requiring precise alignment), and then coupled back in the fiber for amplification. While effective, the use of such external components negates several important advantages of fiber lasers—namely, their integrated (i.e., all-fiber) construction, their lack of need for precise alignment, and their compactness.

A number of attempts have been made to use a dispersive delay line consisting of a segment of optical fiber spliced between a fiber oscillator and a fiber amplifier, thus keeping a system all-fiber at least up to a final compression stage. Unfortunately, there are no fiber designs suitable for pulse compression when the pulse energy exceeds a few µJ.

The chromatic dispersion of a standard silica-based step-index single-mode fiber in the 1000 nm wavelength range is about −40 ps/nm/km. This is sufficient to stretch 100 femtosecond (fs) pulses to about 0.5 ns duration in 1 km of fiber length. Unfortunately, not any optical fiber can be used to stretch the pulse because the properties of the fiber do not allow for the stretched pulse to be converted back to the short (e.g., femtosecond) duration using bulk diffraction grating-based compressors. This is because the typical single-mode fiber has a relatively large third order dispersion (a.k.a. dispersion slope) and fourth order dispersion (a.k.a. dispersion curvature). The known bulk diffraction grating compressor designs usually have positive third order dispersion and therefore cannot compensate for the (also positive) third order dispersion of the fiber used to stretch the pulse. The result is a distorted pulse whose power is spread out into the "wings" surrounding the main power peak. An additional third order dispersion compensator using bulk glass prisms can be built to try to obtain a good pulse shape, but such a design increases the size and complexity of the system as a whole and creates additional loss, which translates into less output power.

SUMMARY

The present disclosure includes optical fibers for performing pulse stretching. The optical fibers have great use in optical fiber lasers so that optical pulses can be stretched in a manner that then allows the stretched pulses to be efficiently compressed to produce high-quality output pulses from the fiber laser. The optical fibers (called "pulse-stretching fibers" or "PS fibers" for short) are designed to have low fourth-order chromatic dispersion (dispersion curvature) and a third order chromatic dispersion (dispersion slope) with a small negative, nearly zero or small positive value. The PS fibers have a relatively small (approximately 20 µm$^2$) effective area.

Two different approaches of using the PS fiber in fiber lasers for stretching ultra-short (e.g., femtosecond duration) light pulses to >1 ns in duration are presented. Both result in stretched output pulses that can be compressed to form a high-quality output pulse of <100 fs in duration (pulse width) even in the presence of some amount of spectral broadening caused by self-phase modulation in the PS fiber. The PS fiber of the present invention enables efficient, all-fiber (up to the final pulse compressor) ultra-short pulsed laser systems reaching pulse energies exceeding 100 µJ, average powers exceeding 100 W, and output pulse widths of less than 100 fs.

Accordingly, a first aspect of the disclosure is a pulse-stretching optical fiber ("PS fiber") for temporally stretching optical pulses. The fiber includes a segmented core having a central core region with a relative refractive index $\Delta_1$, an inner annular core region surrounding the central core region and having a relative refractive index $\Delta_2$ where $\Delta_2 < \Delta_1$, and an outer ring region surrounding the inner annular core region and having a relative refractive index $\Delta_3$ wherein $\Delta_3 > \Delta_2$. The fiber also includes a cladding region surrounding the segmented core and having a relative refractive $\Delta_4$ wherein $\Delta_2 < \Delta_4 < \Delta_1, \Delta_3$. The fiber also includes a chromatic dispersion of equal to or less than −80 ps/nm/km, and a chromatic dispersion slope in the range between −0.1 and 0 ps/nm$^2$/km at a target wavelength $\lambda_T$.

A second aspect of the disclosure is an optical fiber laser. The optical fiber laser includes a laser configured to provide input pulses having an input pulse width. The optical fiber laser also includes the above-described PS fiber optically coupled to the laser. The PS fiber has a length $L_{10}$ sufficient to temporally stretch the input pulses to form stretched pulses. The optical fiber laser also includes a fiber amplifier optically coupled to the PS fiber and configured to receive and amplify the stretched pulses to form amplified stretched pulses. A pulse compressor having dispersion characteristics is optically coupled to the fiber amplifier and is configured to compress the amplified stretched pulses to form temporally compressed output pulses based on the dispersion characteristics. The PS fiber length $L_{10}$, the negative chromatic dispersion and the chromatic dispersion slope operate to substantially compensate for the pulse compressor dispersion characteristics.

A third aspect of the disclosure is a method of forming ultra-short high-energy output pulses from a fiber laser. The method includes generating substantially transform-limited input pulses having an input pulse width. The method also includes passing the input pulses through a length of pulse-stretching (PS) fiber having a segmented core configured to provide at target wavelength a negative chromatic dispersion of at least −80 ps/nm/km, and a chromatic dispersion slope in the range between −0.1 and 0.0 ps/nm²/km so as to stretch the input pulses by at least a factor of 10. The method also includes compressing the stretched input pulses to form output pulses having a pulse width smaller than the input pulse width. In an example embodiment, the output pulse widths are "smaller" than the input pulse widths by a factor of between 0.5 and 20. That is to say, for an input pulse width $W_I$ and an output pulse width $W_O$, in an example embodiment, $0.05W_I \leq W_O \leq 2W_I$. Thus, in an example embodiment, the output pulse can have a pulse width $W_O$ as large as twice the input pulse width.

A fourth aspect of the disclosure is a method of forming temporally stretched optical pulses. The method includes providing input pulses, and then passing the input pulses through a length $L_{10}$ of PS fiber, wherein $20\,m \leq L_{10} \leq 2000\,m$. The PS fiber has a segmented core that, at a target wavelength, provides the PS fiber with a negative chromatic dispersion in the range from −125 to −85 ps/nm/km, and a chromatic dispersion slope in the range between −0.1 and 0.0 ps/nm²/km so as to form the temporally stretched optical pulses.

It is to be understood that both the foregoing general description and the following detailed description present example embodiments to, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments and together with the description serve to explain the principles and operations of the invention.

DETAILED DESCRIPTION

Figure 1:
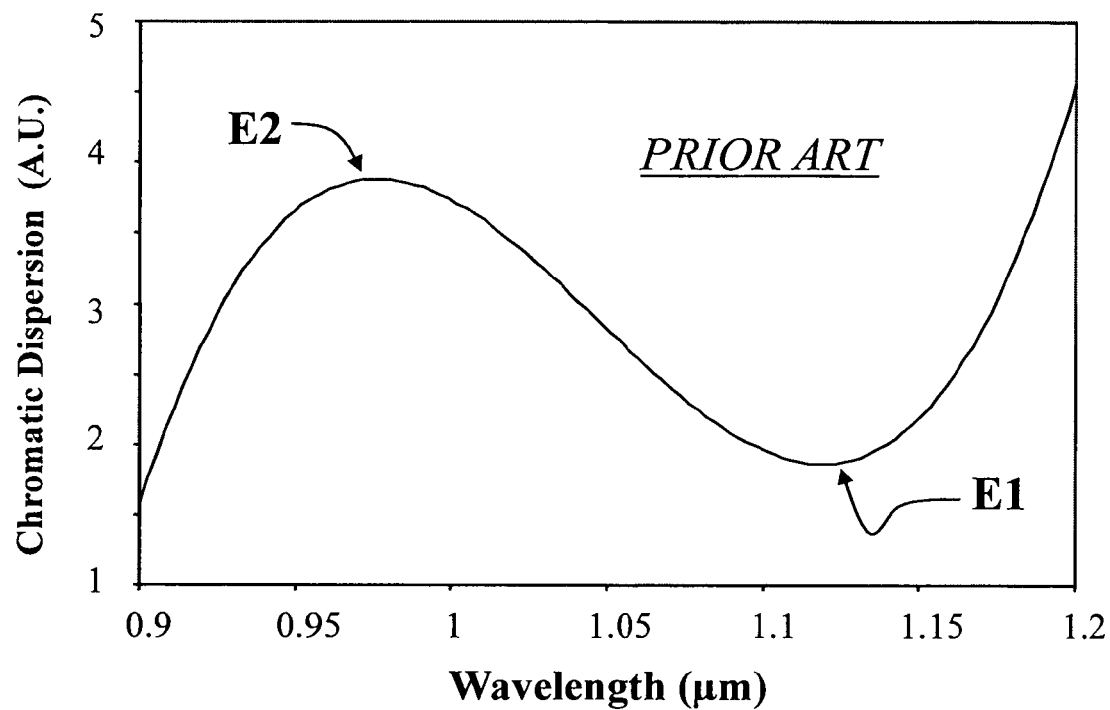
FIG. 1 is a plot of the chromatic dispersion (arbitrary units) as a function of wavelength illustrating the dispersion characteristics of a typical segmented-core optical fiber designed for dispersion compensation applications.

Reference is now made in detail to example embodiments, examples of which are illustrated in the accompanying drawings. Whenever possible, like or similar reference numerals are used throughout the drawings to refer to like or similar parts. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

As discussed above, there is a need for a fiber-based pulse stretcher for use in ultra-short-pulse fiber lasers. Accordingly, the present disclosure includes an optical fiber that produces a small amount of fourth order chromatic dispersion (dispersion curvature) and zero or slightly negative third order chromatic dispersion (dispersion slope) in the 1000 nm wavelength range. The present disclosure also includes fiber laser systems methods that employ the optical fiber as a pulse stretcher. Certain terminology related to optical fibers is first discussed below, followed by a discussion of the PS optical fiber of the disclosure, followed by a discussion of example fiber lasers of the present disclosure that employ the PS optical fiber.

Terminology

In the description below, the "refractive index profile" is the relationship between refractive index or relative refractive index (sometimes called the "refractive index change") and waveguide fiber ("optical fiber") radius. The definition of the relative refractive index as used herein is:

$$\Delta(r) = \frac{n(r)^2 - n_{clad}^2}{2n_{clad}^2}$$

where n is the refractive index of the fiber region in question and $n_{clad}$ is the index of a cladding layer 40 as discussed below. The "relative refractive index percent" is defined as $\Delta(\%) = \Delta(r) \times 100$.

In the discussion below, the relative refractive index $\Delta(r)$ is used below unless otherwise noted.

In cases where the refractive index of a region is less than the average refractive index of the cladding region, the relative refractive index is negative and is referred to as having a "depressed region" or a "depressed index," and is calculated at the point at which the relative refractive index is most negative unless otherwise specified. In cases where the refractive index of a region is greater than the average refractive index of the cladding region, the relative refractive index is positive and the region can be said to be raised or to have a positive index.

An "updopant" is herein considered to be a dopant that has a propensity to raise the refractive index relative to pure undoped $SiO_2$. A "downdopant" is herein considered to be a dopant that has a propensity to lower the refractive index relative to pure undoped $SiO_2$. An updopant may be present in a region of an optical fiber having a negative relative refractive index when accompanied by one or more other dopants that are not updopants. Likewise, one or more other dopants that are not updopants may be present in a region of an optical fiber having a positive relative refractive index. A downdopant may be present in a region of an optical fiber having a positive relative refractive index when accompanied by one or more other dopants that are not downdopants. Likewise, one or more other dopants that are not downdopants may be present in a region of an optical fiber having a negative relative refractive index.

The mode field diameter (MFD) is a measure of the spot size or beam width of light across the end face of an optical fiber. MFD is a function of source wavelength and the fiber geometry, i.e., fiber core radius and fiber refractive index profile. The vast majority of the optical power propagating in an optical fiber travels within the fiber core, with a small amount of power propagating in the cladding as an evanescent field. Mismatches in the mode field diameter can affect splice and connector loss. The MFD is measured using, for example, the Peterman II method wherein, 2w=MFD, and w=$(2\int f^2 r dr/\int [df/dr]^2 r dr)$, the integral limits being 0 to ∞. A method of experimentally measuring the MFD is the variable aperture method in the far field (VAMFF), which is described in the article by Parton, J. R., "Improvements in the Variable Aperture Method for Measuring the Mode-Field Diameter of a Dispersion-Shifted Fiber," *Journal of Lightwave Technology*, Vol. 7, No. 8, August 1989 (pp. 1158-1161), which article is incorporated by reference herein. The MFD is measured in irradiance, which is optical power per unit area ($W/cm^2$).

For a Gaussian power distribution in a single-mode optical fiber, the MFD is measured between points at which the electric and magnetic field strengths are reduced to 1/e of their maximum values, i.e., it is the diameter at which the optical power is reduced to $1/e^2$ of the maximum power, wherein power is proportional to the square of the field strength. As used herein, MFD assumes a given wavelength (e.g., 1550 nm) unless otherwise noted.

A related concept to MFD is the "effective area" of an optical fiber, which is defined as: $A_{eff}=2\pi (\int f^2 r dr)^2/(\int f^4 r dr)$, where r is the radial coordinate, the integration limits are 0 to ∞, and f is the transverse component of the electric field associated with light propagated in the optical fiber.

Optical Fiber for Pulse Stretching

FIG. 1 is a plot of the chromatic dispersion (arbitrary units) as a function of wavelength, illustrating a typical chromatic dispersion structure of a typical prior art segmented-core optical fiber. It is obtained from a conventional telecommunications dispersion compensation fiber design by scaling to a smaller core radius for operation at 1.04 μm. Such fibers generally display two extrema E1 and E2 in their chromatic dispersion curves. Extremum E1 is the right-hand local minimum and corresponds to a resonance of the core and ring modes. The location of extremum E1 is determined almost entirely by the refractive indices and diameters of the core and ring. Because there is strong coupling between the core and ring at the local minimum, one can obtain relatively large effective areas. However, because of the large effective area, the bend sensitivity is generally quite high at the corresponding wavelength. A bend-sensitive fiber is not preferred for use in fiber lasers because the laser cannot be made compact if the fibers cannot have significant bends.

The other extremum E2 in FIG. 1 is the left-hand-side local maximum that forms where the bulk glass material chromatic dispersion (which becomes very negative at short wavelengths) starts to overtake the waveguide chromatic dispersion and becomes the dominant dispersion. The optical mode is strongly core-confined at the corresponding wavelength, and there is little bend loss. However, the effective area of the fiber is very small (e.g. about six $\mu m^2$), which means it cannot carry any significant amount of power without giving rise to the aforementioned adverse non-linear effects. In addition, splicing such ultra-small core fiber to more conventional single-mode fibers will be technically challenging and result in a large loss at the splice.

Also, as discussed above, the chromatic dispersion characteristics of a fiber used for pulse-stretching need to complement the chromatic dispersion characteristics of whatever pulse compressor is used to compress the stretched pulse. This is so that the resulting compressed pulse can have high quality. Preferably, compressed pulses should have less than 25% of total energy outside the main peak (in pulse "wings" or "tails" or "pedestal") and be nearly bandwidth-limited, with a time-bandwidth product of <0.66 (1.5× that of a perfect Gaussian). More preferably, the pulses should have less than 10% of pulse energy outside the main peak and a time-bandwidth product of <0.5 (1.1 times that of a perfect Gaussian). "Bandwidth-limited" refers to a pulse with an optical spectrum exactly as wide as the Fourier transform of its shape in time. How close a pulse is to this condition is characterized by the time-bandwidth product, which is the product of the pulse duration and the spectral width. For a perfect Gaussian, the product is 0.44; for perfect hyperbolic secant-square, the product is 0.315.

The article by Shah, L., Z. Liu, I. Hartl, G. Imeshev, G. C. Cho, and M. E. Fermann, entitled "High energy femtosecond Yb cubicon fiber amplifier," *Optics Express* 13, no. 12. (Jun. 13, 2005), which article is incorporated herein by reference, describes a fiber chirped-pulse amplification system designed in such a way that the self-phase modulation in the amplifier fiber partially compensates for the third order dispersion (TOD) mismatch between a fiber stretcher and a grating compressor. Even with such partial compensation, residual TOD mismatch results in a time-bandwidth product of output pulses of 0.8 and a significant amount of energy remaining in the "pedestal."

Figure 2:
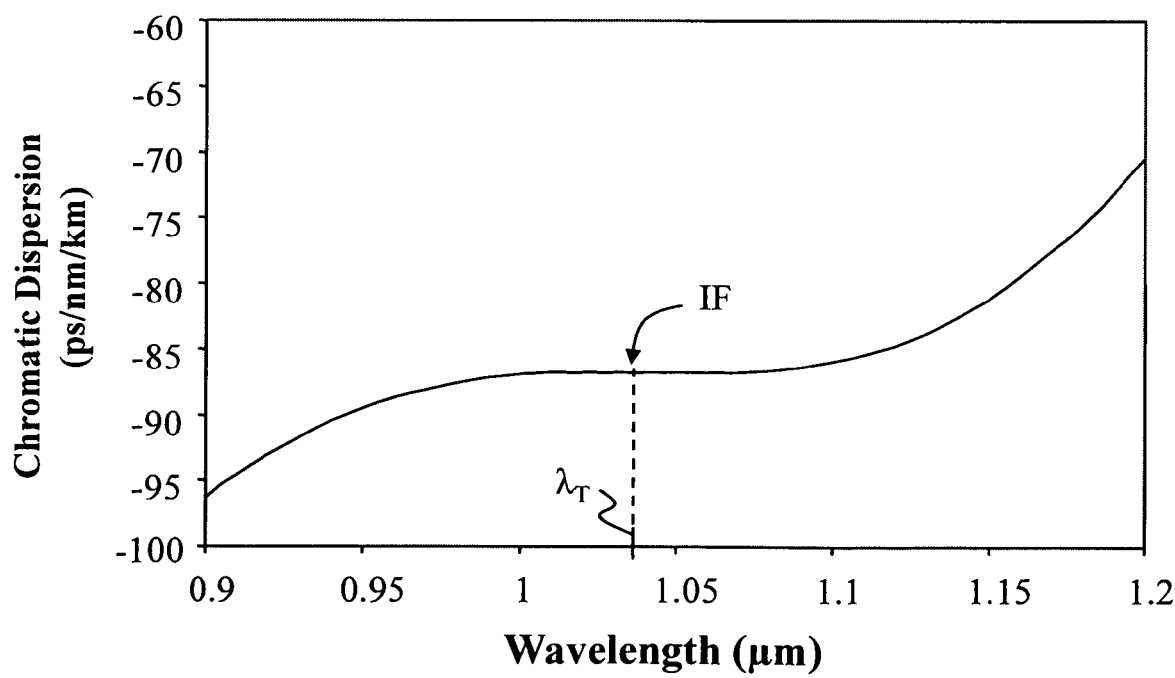
FIG. 2 is a plot similar to FIG. 1 but illustrating the chromatic dispersion characteristics of the pulse-stretching (PS) fiber of the present disclosure.

Consequently, the inventors designed a new pulse-stretching (PS) optical fiber having a refractive index profile suitable for use in combination with available pulse compressors. The PS optical fiber of the present invention moves the local maximum and minimum E2 and E1 (FIG. 1) to essentially at the same wavelength (the target wavelength $\lambda_T$), creating an inflection point IF, as shown in the chromatic dispersion plot of FIG. 2. This allows for optimizing both bend loss (and hence robustness) and effective area (and thus power-carrying ability) while achieving a zero dispersion slope at a given target wavelength $\lambda_T$ (which in the example plot of FIG. 2 is 1040 nm) so that the pulse compression operation results in a truly high-quality output pulse.

If the fiber manufacturing process for the PS fiber of the present disclosure goes slightly off target, the effect will be for the substantially co-located chromatic dispersion maximum and minimum E1 and E2 to start to separate, producing a region of small negative slope at the target wavelength $\lambda_T$. This is not necessarily a disadvantage, and in fact in some cases can be desirable, for example to offset the small positive dispersion slope of a bulk-grating type of pulse compressor.

Pulse-Stretching Fiber

Figure 3:
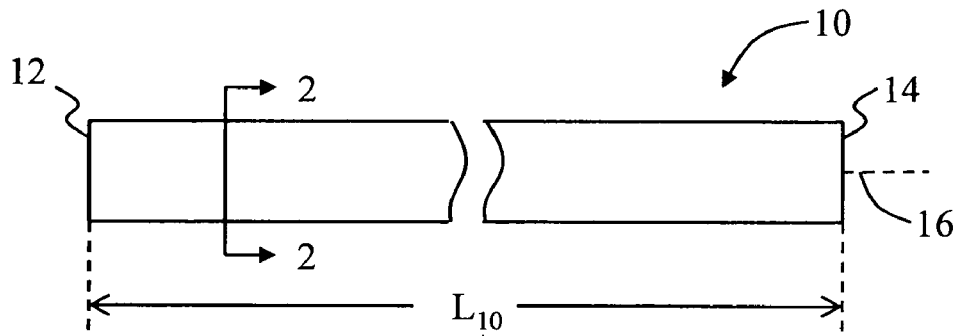
FIG. 3 is a schematic side view of a section of the PS fiber according to the present disclosure.
Figure 4:
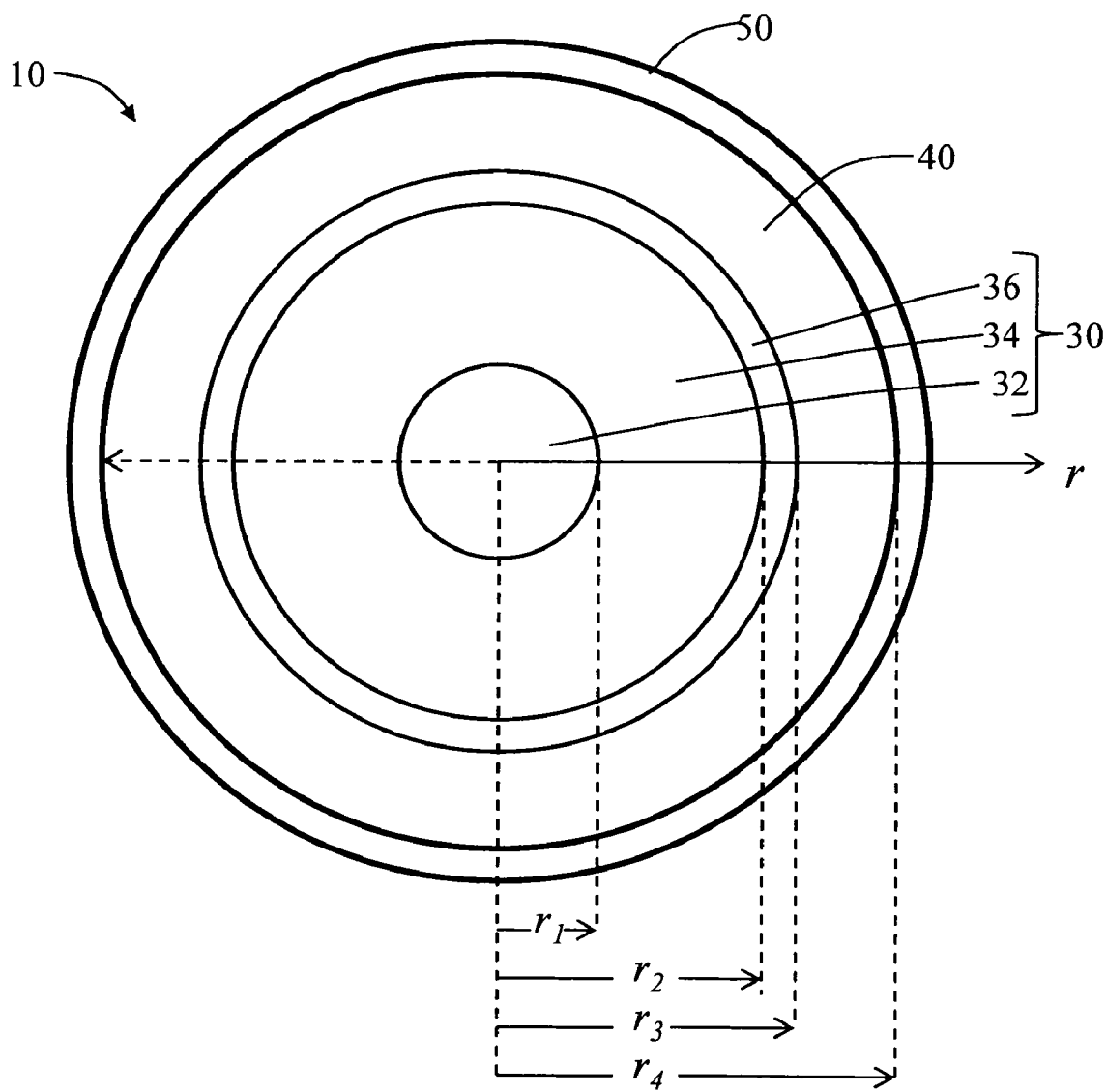
FIG. 4 is a cross-sectional view of the PS fiber of FIG. 3 as taken along 2-2 in FIG. 1.

FIG. 3 is a schematic side view of a section of PS fiber 10 according to the present invention. PS fiber 10 has a length $L_{10}$ and includes first and second end faces 12 and 14 and a central axis 16. FIG. 4 is a cross-sectional view of PS fiber 10 taken along 2-2 as shown in FIG. 3. PS fiber 10 includes a "core plus ring" segmented-core structure, referred to herein as a "segmented core" 30. Segmented core 30 includes a central core region ("central core") 32 having a radius $r_1$ and a relative refractive index $\Delta_1$, an inner annular core region 34 having an inner radius $r_1$, an outer radius $r_2$ and a relative refractive index $\Delta_2$, and a relatively thin outer annular core region or "ring" 36 having an inner radius $r_2$, an outer radius $r_3$ and a relative refractive index $\Delta_3$. PS fiber 10 also includes a cladding region ("cladding") 40 having an inner radius $r_3$, an outer radius $r_4$, and a refractive index $n_{clad}$ which by definition provides a relative refractive index $\Delta_4=0$. PS fiber 10 also optionally includes an outer protective layer 50 such as a buffer layer, a jacket and/or a covering.

Figure 5A:
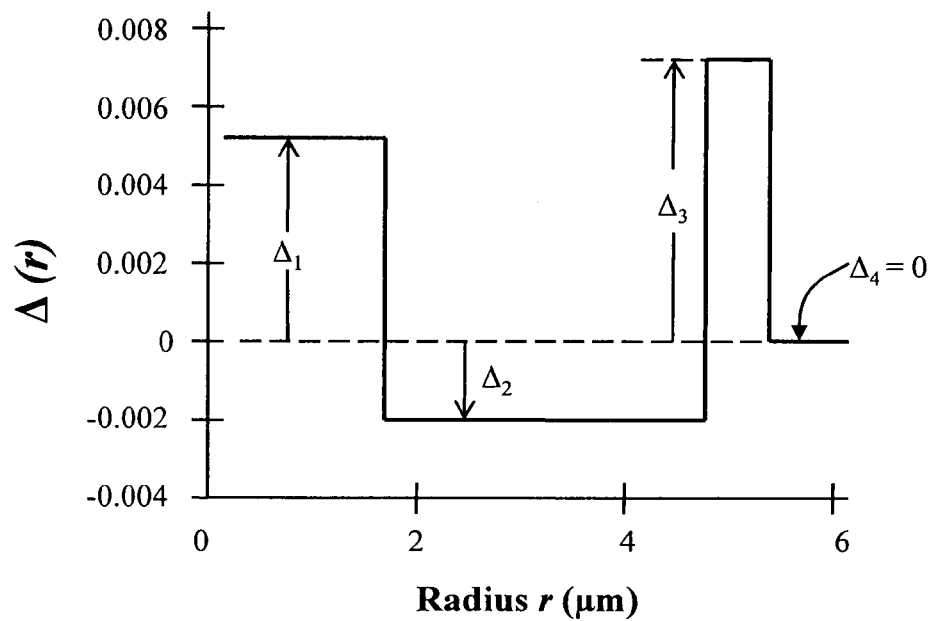
FIG. 5A is a plot of the relative refractive index Δ(r) as a function of fiber radius r for the PS fiber of the present disclosure illustrating an example relative refractive index that yields the chromatic dispersion curve of FIG. 2.

FIG. 5A is a plot of the relative refractive index $\Delta(r)$ as a function of fiber radius r for PS fiber 10 illustrating example values of the relative refractive index that yield the chromatic dispersion curve of FIG. 2. Segmented core 30 is designed so that the resonant anomalous dispersion of the coupled structure cancels the normal dispersion tilt of the bulk glass. This balancing gets more difficult as the target wavelength $\lambda_T$ gets smaller, and in particular the bandwidth over which a flat dispersion curve can be maintained diminishes with decreasing wavelength. Although a wide bandwidth is not essential, a wideband makes PS fiber 10 easier to manufacture to target specifications.

Figure 5B:
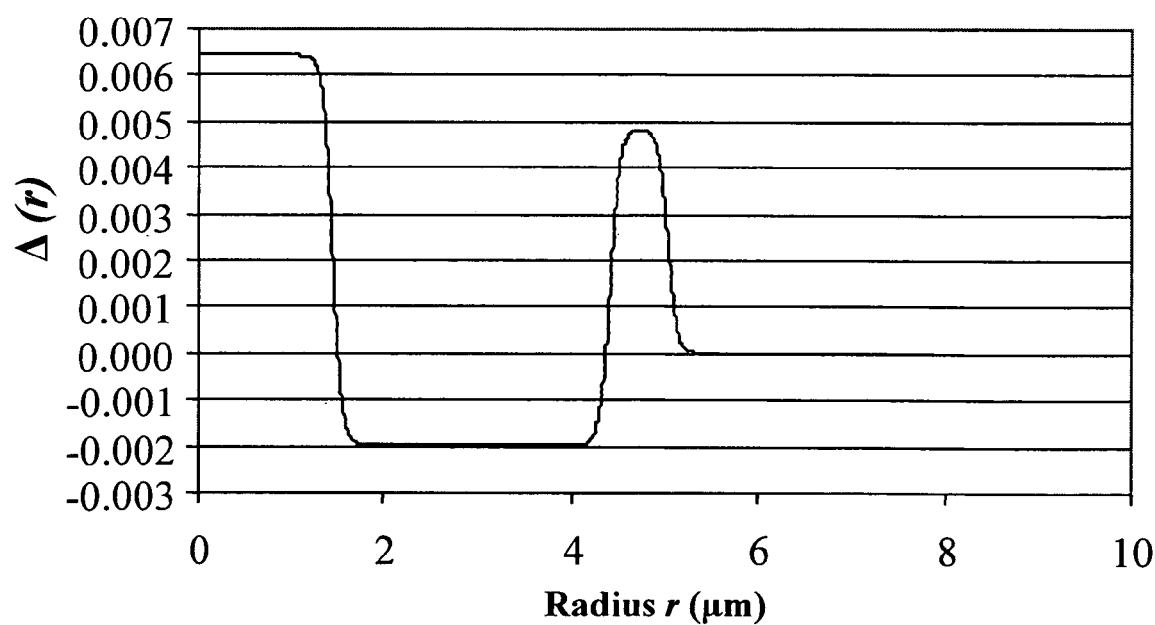
FIG. 5B is a computer simulation of an optical refractive index profile of the present disclosure similar to that of FIG. 5A but which accounts for dopant diffusion in the fiber manufacturing process.
Figure 6A:
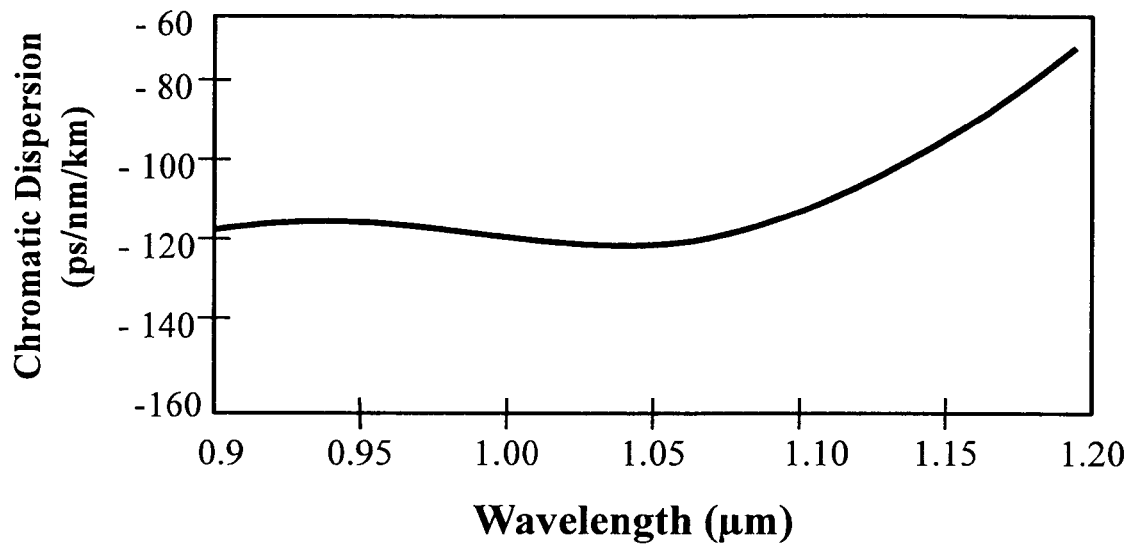
FIG. 6A is a plot of the chromatic dispersion (ps/nm/km) as a function of wavelength (μm) illustrating the dispersion characteristics for the diffused refractive index profile of FIG. 5B.

One skilled in the art of fiber manufacturing knows that idealized square-shaped refractive index profiles such as shown in FIG. 5A are idealized and rather difficult to fabricate in practice with great precision using standard fiber manufacturing technologies such as MCVD or OVD. However, the idealized refractive index profile of FIG. 5A and the associated chromatic dispersion curve of FIG. 2 demonstrate the existence of refractive index profiles with suitable pulse-stretching properties that will be present in corresponding diffusion-rounded profiles. Such rounded profiles can readily adjusted to achieve comparable performance to the idealized step-index profiles. FIG. 5B is a computer simulation of an optical refractive index profile according to the present invention similar to that of FIG. 5A, but that accounts for dopant diffusion in the fiber manufacturing process. FIG. 6A is a plot of the chromatic dispersion (ps/nm/km) as a function of wavelength (μm) illustrating the dispersion characteristics for the diffused refractive index profile of FIG. 5B. The refractive index profile of FIG. 5B is expected to perform equivalent to or better than the perfect step-index profiles such as shown in FIG. 5A and described above, but whose edges have been rounded by dopant diffusion during the manufacturing process. The predicted chromatic dispersion curve of FIG. 6A indicates the chromatic dispersion at 1040 nm is about −123 ps/nm/km, its cutoff is about 963 nm, its effective area at 1040 nm is about 22.3 □m², and its bend loss is about 0.09 dB/km.

Two-Segment Fiber

Figure 5C:
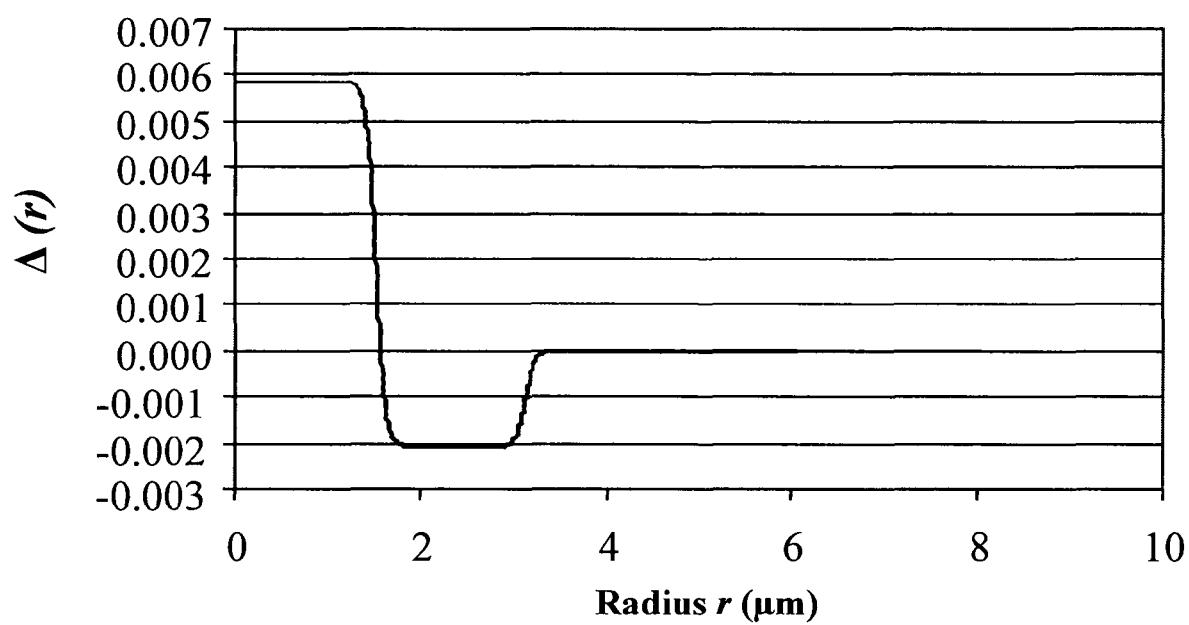
FIG. 5C is an optical fiber refractive index profile that does not include the third annular segment and that can have similar dispersion characteristics to the present disclosure, but that also has significantly worse bending loss.

It is possible to achieve a suitable dispersion curve for pulse stretching using a "two-segment" fiber that does not include the third annular segment (i.e., annular ring 36). FIG. 5C is an optical fiber refractive index profile that does not include the third annular ring 36 and that can have similar dispersion characteristics to the present invention, but that also has significantly worse bending loss. The effective area of this design is 22 □m² at 1040 nm, which is comparable to the three-segment embodiments. However, two-segment profiles such as shown in FIG. 5C are much more sensitive to bending and thus tend to be impractical for use in a fiber laser.

Figure 6B:
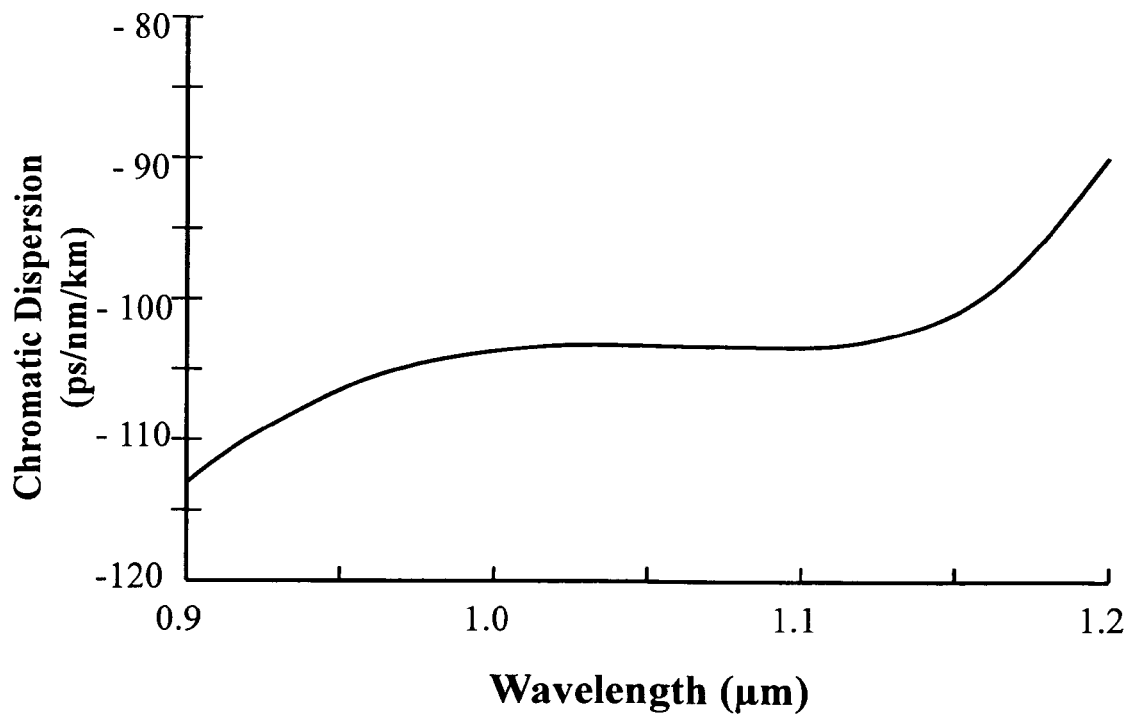
FIG. 6B is a plot of the chromatic dispersion (ps/nm/km) as a function of wavelength (μm) illustrating the dispersion characteristics for the diffused refractive index profile of FIG. 5C.

FIG. 6B is a plot of the chromatic dispersion (ps/nm/km) as a function of wavelength (μm) illustrating the dispersion characteristics for the diffused refractive index profile of FIG. 5C. Annular ring 36 in the three-segment fiber increases the cutoff wavelength and provides more bend robustness at the same effective area, making three-segment fibers much easier to use in practice that the two-segment fibers.

EXAMPLES

Table 1 below sets forth eight different example refractive index profiles for PS fibers 10 that achieve substantially zero dispersion slope at 1040 nm. As can be seen from Table 1, there is a very strong correlation between bend loss and effective area that in an example embodiment limits the fiber effective area to be between about 20 and about 30 μm² and preferably between about 22 and about 30 μm² at 1040 nm. The refractive index profile of FIG. 5A corresponds to profile #8 in Table 1.

TABLE 1

Example refractive index profile parameters (see FIG. 5A)

| # | $r_1$ | $r_2$ | $r_3$ | $\Delta_1$ | $\Delta_2$ | $\Delta_3$ | Dispersion | eff. area | Cutoff | Bend Loss |
|---|---|---|---|---|---|---|---|---|---|---|
| 1 | 1.571 | 3.391 | 3.813 | .00592 | −.00252 | .00245 | −102 | 20.14 | 554 | 0.147 |
| 2 | 1.602 | 4.764 | 5.465 | .00500 | −.00132 | .00179 | −93 | 25.24 | 638 | 124 |
| 3 | 1.749 | 5.027 | 5.229 | .00458 | −.00149 | .00898 | −86 | 25.60 | 734 | 34.9 |
| 4 | 1.670 | 5.257 | 5.875 | .00454 | −.00122 | .00274 | −93 | 29.62 | 816 | 1571 |
| 5 | 1.568 | 4.754 | 5.401 | .00529 | −.00148 | .00309 | −101 | 25.18 | 857 | 26.8 |
| 6 | 1.681 | 5.074 | 5.792 | .00534 | −.00150 | .00343 | −84 | 20.68 | 976 | 6.2E−8 |
| 7 | 1.687 | 4.241 | 5.167 | .00538 | −.00222 | .00293 | −99 | 22.60 | 934 | 9.3E−5 |
| 8 | 1.780 | 4.805 | 5.262 | .00519 | −.00203 | .00719 | −87 | 21.50 | 1004 | 1.5E−8 |

In Table 1, the chromatic dispersion is in ps/nm/km at a target wavelength $\lambda_T=1040$ nm, the effective area is in $\mu m^2$ at 1040 nm, the cutoff is in nm in straight fiber (i.e., no bends), and the bend loss is in dB/km at 1040 nm at a six-inch bend diameter. In one example embodiment, PS fiber 10 is designed so that the target wavelength $\lambda_T$ is in the range 1030 nm≦$\lambda_T$≦1100 nm, while in another example embodiment the range is 1030 nm≦$\lambda_T$≦1080 nm.

In an example embodiment, PS fiber 10 has a chromatic dispersion ≦−80 ps/nm/km, and a chromatic dispersion slope in the range between −0.1 and 0 ps/nm²/km at a target wavelength $\lambda_T$. In another example embodiment, the chromatic dispersion of PS fiber 10 is in the range from −125 to −85 ps/nm/km.

In an example embodiment, PS fiber 10 includes dopants in at least a portion of segmented core 30 that cause at least a portion of core 30 to serve as a gain medium so that the PS fiber can be used as a fiber amplifier. In an example embodiment, doped PS fiber 10 is used as a self-similar amplifier SSA as discussed below. In another example embodiment, doped PS fiber 10 is used to form a stretched-pulse mode-locked oscillator (laser) 104 as is also discussed below, resulting in a higher quality linearly chirped pulse output than in the case of conventional step-index active fibers.

Table 2 and Table 3 set forth additional design parameters for PS fiber 10:

TABLE 2

Fiber Design Parameter Ranges

| Parameter | Min | Max |
|---|---|---|
| $r_1$ | 1.45 | 1.8 |
| $r_2$ | 3.3 | 5.2 |
| $r_3$ | 3.8 | 5.9 |
| $\Delta_1$ | 0.0045 | 0.0065 |
| $\Delta_2$ | −0.0025 | −0.0012 |
| $\Delta_3$ | 0.0017 | 0.009 |

TABLE 3

"More Preferable" Fiber Design Parameter Ranges

| Parameter | Min | Max |
|---|---|---|
| $r_1$ | 1.48 | 1.78 |
| $r_2$ | 4.0 | 5.0 |
| $r_3$ | 5.1 | 5.4 |
| $\Delta_1$ | 0.005 | 0.0065 |
| $\Delta_2$ | −0.0022 | −0.0015 |
| $\Delta_3$ | 0.0029 | 0.0072 |

As discussed above, it is difficult to manufacture perfectly step-like refractive index profiles. However, this is not an impediment to reducing the invention to practice. Those skilled in the art know how to make small modifications within the claimed range of design parameters to compensate for minor shape changes caused by dopant diffusion.

Fiber Laser with Ps Fiber

Figure 7A:
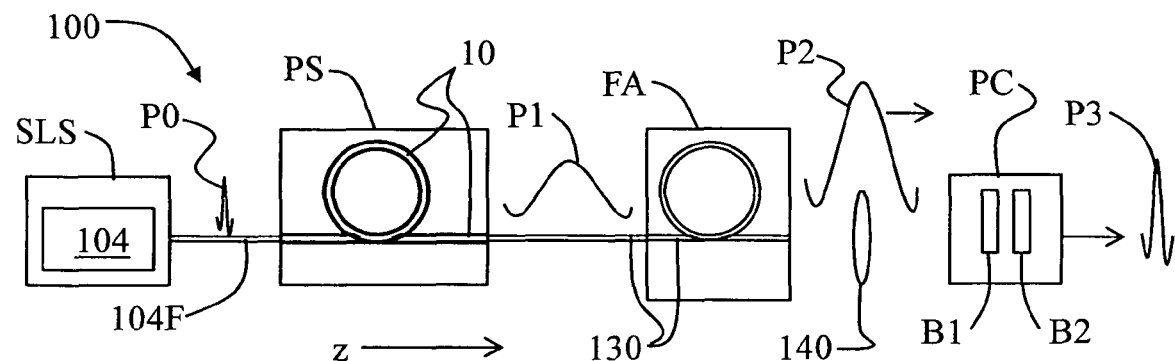
FIG. 7A is a schematic diagram of a generalized embodiment of a fiber laser system according to the present disclosure that includes the PS fiber according to the present disclosure.

PS fiber 10 is intended for use as a pulse stretcher in a fiber laser, such as described in U.S. Pat. No. 6,885,683 (the '683 patent), which patent is incorporated by reference herein. FIG. 7A is a generalized schematic diagram of a fiber laser system 100 that includes an input or "seed" light source SLS, a pulse stretcher PS, a fiber amplifier FA, and a pulse compressor PC. Seed light source SLS, pulse stretcher PS and fiber amplifier FA are fiber-based and in one embodiment are directly connected to each other by splicing. Pulse compressor PC is non-fiber-based and is thus "external" to the fiber-based portion of fiber laser system 100. The z-direction is shown in FIG. 7A and is from left to right, and is the general direction of light travel from seed light source SLS to pulse compressor PC.

Seed light source SLS includes an oscillator or laser 104 that is shown as including a laser output fiber portion 104F and that generates initial, temporally short-pulse-width (e.g., femto-second) light pulses P0. Pulse stretcher PS includes a section of PS fiber 10, which is optically connected to (e.g., fusion spliced) to laser output fiber portion 104F.

In an example embodiment, PS fiber 10 has a length $L_{10}$ in the range 20 m≦$L_{10}$≦2000 m. Fiber amplifier FA includes a section of doped optical fiber 130 (e.g., Yb-doped) along with pump light sources (not shown) that cladding or core-pump the doped optical fiber. Doped optical fiber 130 is optically connected (e.g., fusion spliced) to PS fiber 10. In an example embodiment, PS fiber 10 and/or doped fiber 130 are polarization maintaining.

Pulse compressor PC preferably consists of a dispersive delay line constructed from one or two optical components B, such as bulk optical elements (e.g., two components B1 and B2, as shown). Example bulk optical components B include diffraction gratings, which are used for compactness. Alternatively, pulse compressor PC comprises a number of bulk optical components B in the form of prisms and/or volume (bulk) Bragg gratings and/or mirrors. Optical coupling between fiber amplifier FA and pulse compressor PC can be performed by an optical system 140 such as a bulk optic lens system as represented schematically by a single lens in FIG. 1.

In the operation of fiber laser system 100, laser 104 of seed light source SLS generates initial light pulses P0, which are coupled into PS fiber 10 of pulse stretcher PS. PS fiber 10 dispersively stretches (in time) pulses P0 to form (temporally)

stretched pulses P1. Stretched pulses P1 are subsequently coupled into the fundamental mode of doped fiber 130 of fiber amplifier FA. There, the stretched pulses are amplified, e.g., by at least a factor of 10, thereby forming amplified pulses P2. In an example embodiment, temporally stretched pulses P1 have a pulse width between 10 times to 2000 times greater than the input pulse width. Amplified pulses P2 are then coupled into pulse compressor PC, where they are temporally compressed to form compressed pulses P3 having a duration approximately determined by the bandwidth limit associated with input pulses P0.

The pulse-stretching properties of pulse stretcher PS correspond to the pulse-compression properties of pulse compressor PC. For a given pulse compressor PC, the length L of PS fiber 10 is selected so that the net total chromatic dispersion and slope are equal and opposite in sign to that of the compressor module. In a perfect linear propagation case, this alone would be sufficient to obtain ideal transform-limited light pulses P3 at the output of fiber laser system 100. However, PS fiber 10 has a relatively small effective area, which means that nonlinear propagation cannot be avoided unless pulses are attenuated to a very low power, which makes subsequent amplification difficult. Therefore, the effects of spectral broadening due to self-phase modulation in PS fiber 10 need to be taken into account.

The present invention thus includes two different approaches for minimizing the impact of this spectral broadening on the final (output) pulse shape. The first approach uses a self-similar amplifier prior to performing pulse stretching. The second approach uses a stretched-pulse mode-locked fiber laser as seed laser source 104. Systems and methods for these two approaches are discussed in detail below.

The efficacy of the two approaches was evaluated by the inventors using a numerical model similar to that presented by A. C. Peacock, R. J. Kruhlak, J. D. Harvey, and J. M. Dudley, in the article entitled "Solitary pulse propagation in high gain optical fiber amplifiers with normal group velocity dispersion," Optics Comm., V. 206, pp. 171-177 (2002), which article is incorporated by reference herein. The modeling was based on the so-called nonlinear Shroedinger equation (NLSE) for pulse propagation with a Lorentzian gain term included to take into account effects related to gain narrowing (i.e., insufficient gain bandwidth to amplify all of the spectral components of the pulse equally) and gain dispersion. The NLSE was solved using a commonly applied split-step Fourier numerical technique.

Fiber Laser with Ps Fiber and Self-Similar Amplifier

Figure 7B:
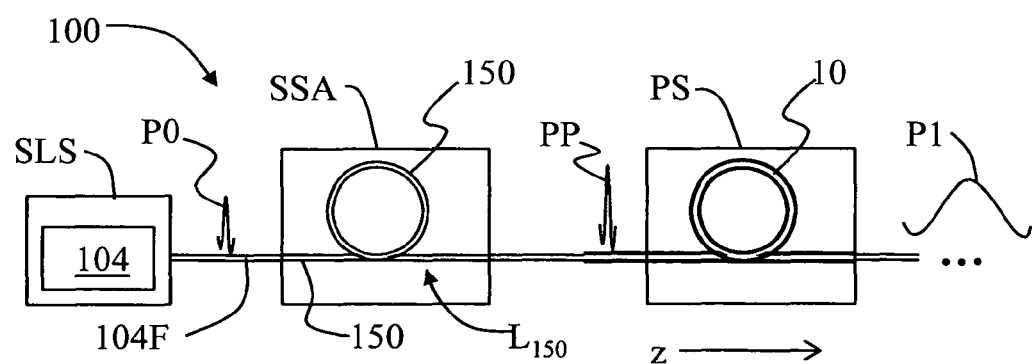
FIG. 7B is a close-up view of a portion of an example embodiment of the fiber laser of FIG. 7A that includes a self-similar amplifier (SSA) upstream of the PS fiber so that the PS fiber receives a parabolic pulse (PP)

The first approach is based on using a self-similar preamplifier before pulse stretching. FIG. 7B illustrates a portion of a modified version of fiber laser system 100 of FIG. 7A that includes a self-similar amplifier SSA comprising a doped optical fiber 150 of length $L_{150}$. Self-similar amplifier SSA is disposed upstream of pulse stretcher module PS and is optically coupled to PS fiber 10 therein. In an example embodiment, self-similar amplifier SSA is disposed between seed light source SLS and pulse stretcher PS and is directly coupled at one end to laser 104 and at its opposite end to PS fiber 10, as is shown in FIG. 7A.

It is known that short optical pulse propagation in a fiber amplifier with a fiber (150) having normal (negative) dispersion results in a formation of a parabolic pulse PP which, in the absence of gain narrowing, propagates "self-similarly," meaning that the spectrum continuously broadens by self-phase modulation and the pulse width increases while the pulse shape remains parabolic.

One of the features of self-similar amplification of a light pulse is the preservation of a linear phase change of the light wave across the light pulse. This means that the output pulse can be compressed to its substantially transform-limited temporal duration, resulting in a high-quality output light pulse that is temporally shorter than the light pulse that entered the self-similar amplifier. It can be shown that if such a parabolic pulse (e.g., pulse PP) is propagated in passive fiber having normal dispersion, the linear phase property is substantially preserved despite the additional self-phase modulation that takes place in the absence of gain.

The use of a self-similar amplifier followed by fiber-based pulse stretcher in an all-fiber chirped pulse amplification is mentioned in the aforementioned '683 patent. However, there is no teaching in the '683 patent of the specific fiber design needed to match the higher-order dispersion of the pulse compressor, and there is no teaching of optimizing the self-similar amplifier to produce high-quality output pulses. The inventors have found that using fibers and amplifiers in accordance with the prior art to perform self-similar amplification and pulse stretching resulted in low-quality and unsatisfactory output pulses P3.

For numerical modeling of self-similar amplifier SSA, fiber parameters typical of a single-mode Yb-doped fiber amplifier were assumed, namely: a relatively low Yb doping level to provide a gain of 3.3 dB/m and a loss of 1.0 dB/m (net gain of 2.3 dB/m), an effective area of 40 $\mu m^2$, and a dispersion and slope of −40 ps/nm/km and 0.2 ps/nm²/km. The nonlinear refractive index was taken as $n_2$=2.6e-20 m²/W and a polarization relaxation time 0.02 ps (~15 THz gain bandwidth) was used. The input pulse P0 was a transform-limited Gaussian. Formation of parabolic pulses PP was observed for an input pulse width in the range between 0.2 ps and 3.0 ps. Such short input pulses P0 can be produced by a variety of mode-locked fiber laser designs, with linear or ring cavities, based on semiconductor saturable absorber mirrors or nonlinear polarization evolution to induce mode locking. Such mode-locked lasers are discussed below. Note that now parabolic pulses PP effectively serve as a modified form of input pulse P0 and so are also referred to below in some instances as input pulses.

To assess the linearity of the light wave phase change across optical pulses PP at the output of self-similar amplifier SSA (which determines the pulse quality obtainable after stretching, amplification and compression), an optimum amount of dispersion was applied to the pulse, and resulting pulse shape analyzed in the numerical modeling for various combinations of the self-similar amplifier SSA parameters and input pulse P0 parameters. It was found that, for each input pulse P0 width in the range of 0.2 to 3.0 ps, there was an optimum value of the pulse energy, and that the optimum length $L_{150}$ of fiber in self-similar amplifier SSA in all cases was about 7 m, from the point of view of maximum linearity of the phase, and therefore maximum quality of the compression.

When the length of self-similar amplifier SSA is too short, the parabolic regime does not have enough time to develop, and when it is too long, gain narrowing starts to play a role, gradually causing a deviation from linear phase and transforming a pulse into a solitary wave. The best result obtained was produced for an input pulse P0 having a width of 1.0 ps and a peak power of 500 W (0.5 nJ pulse energy), which was transformed into a ~5 ps long parabolic pulse PP with ~20 nJ energy at the end of self-similar amplifier SSA with doped fiber 150 length $L_{150}$=7 m, with a total gain of 16.1 dB.

Figure 8A:
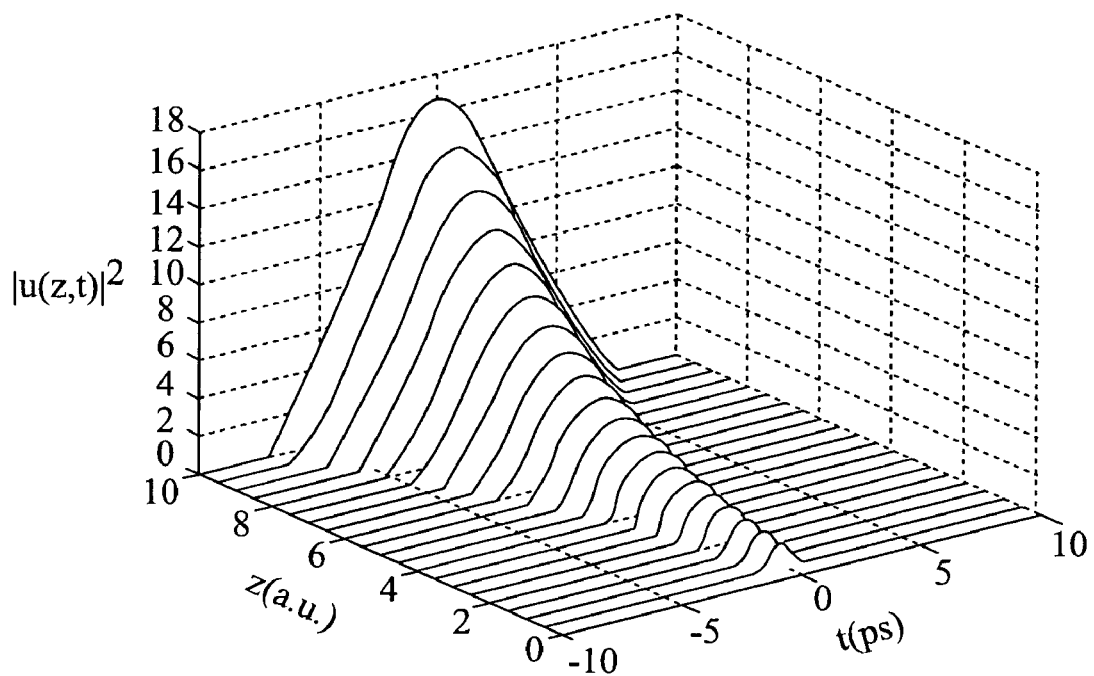
FIG. 8A is a plot of the time evolution of the pulse shape for the parabolic pulse associated with the self-similar amplifier of FIG. 7B as the pulse travels through the self-similar amplifier, wherein the two horizontal axes are time t (ps), distance z (arbitrary units) and the vertical axis is the normalized pulse intensity.
Figure 8B:
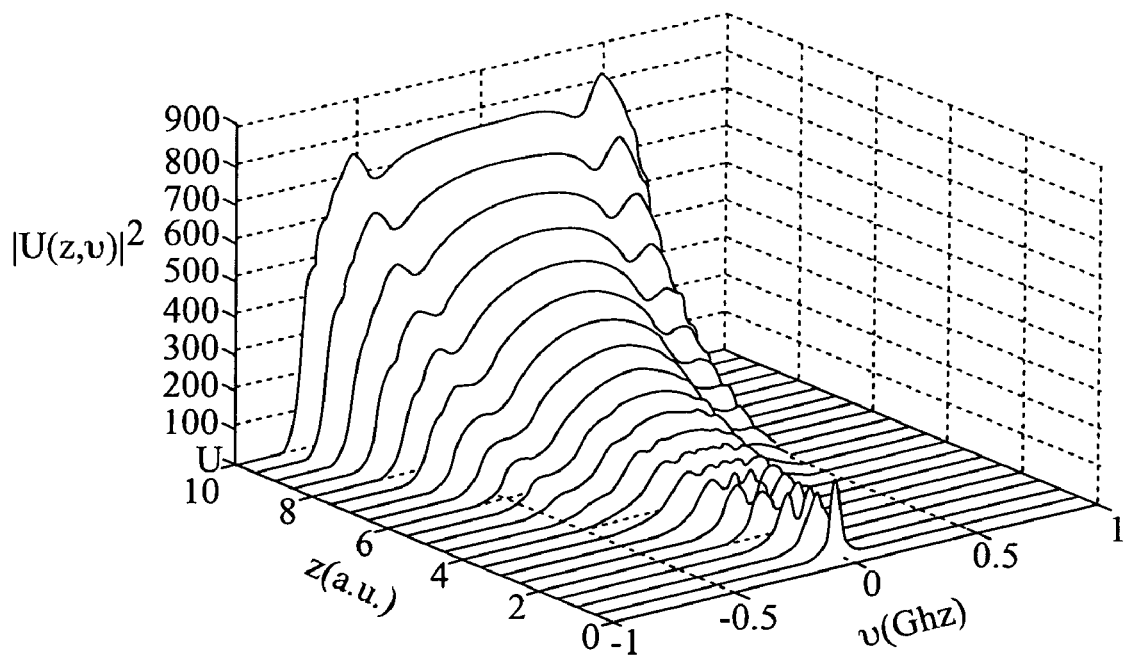
FIG. 8B is a plot of the time-evolution of the pulse spectrum of the parabolic pulse of FIG. 8A, wherein the two horizontal axes are the frequency ν (GHz), distance z (arbitrary units) and the vertical axis is the normalized intensity.

FIG. 8A is a plot of the time evolution of the pulse shape for the parabolic pulse as it travels through the self-similar amplifier of FIG. 7A, wherein the two horizontal axes are the time t (ps), distance z (arbitrary units) and the vertical axis is the normalized pulse intensity. FIG. 8B is a plot of the time-evolution of the pulse spectrum of the parabolic pulse of FIG. 8A, wherein the two horizontal axes are the frequency ν (GHz), distance z (arbitrary units) and the vertical axis is the normalized intensity.

Next, the propagation of output pulse PP from self-similar amplifier SSA in PS fiber 10 was modeled. PS fiber 10 was assumed to have −100 ps/nm/km chromatic dispersion, zero dispersion slope and an effective area of 20 μm². The length $L_{10}$ of PS fiber 10 was set to 200 m, which is sufficient to stretch parabolic pulse PP to have a pulse width of >1 ns. The output pulse P2 from pulse stretcher PS was then compressed to form output pulse P3.

Figure 9A:
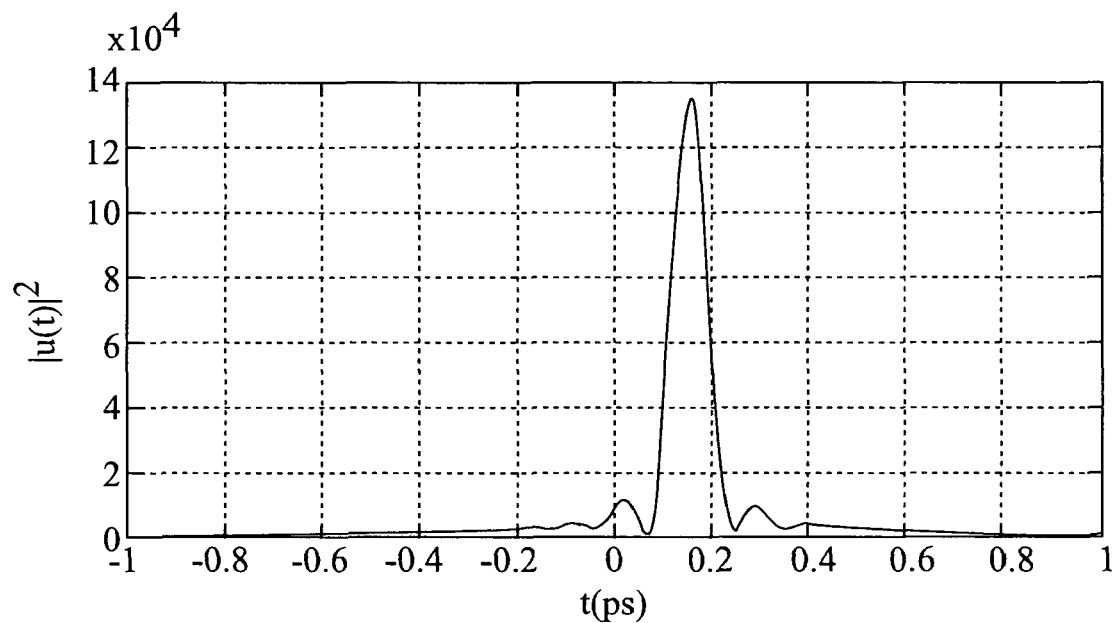
FIG. 9A is a plot the normalized intensity as a function of time t (ps) for the final output pulse shape after applying +19.991 ps/nm of chromatic dispersion to compress the stretched parabolic pulse, where the initial pulse is 1.0 ps long, 500 W peak power Gaussian.
Figure 9B:
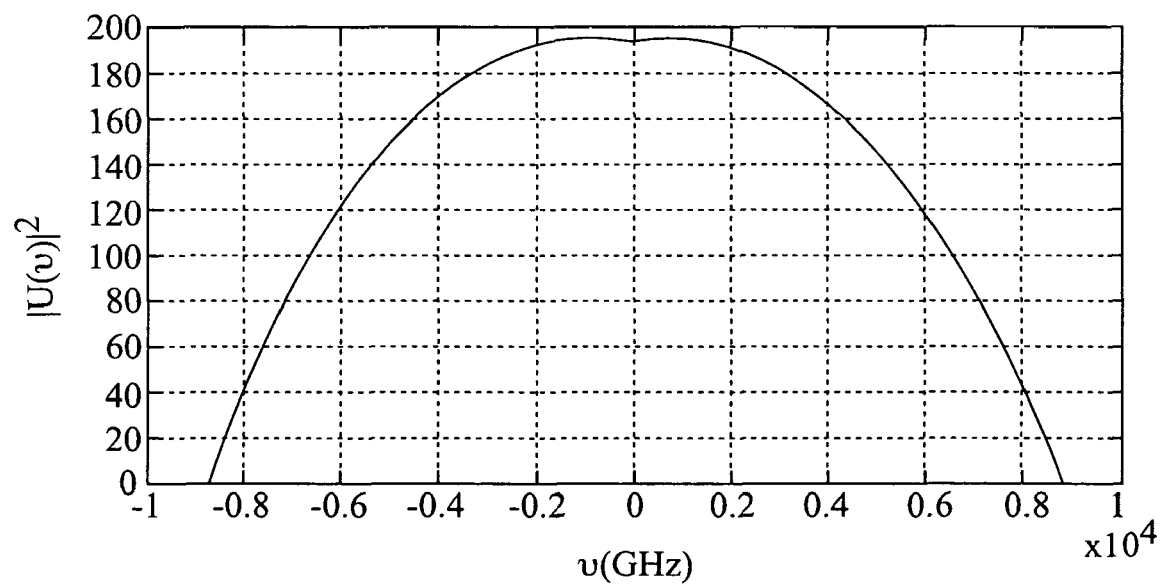
FIG. 9B is a plot of the frequency spectrum for the final output pulse of FIG. 9A.

It was found that the best output pulses P3 were obtained for all widths of input pulse P0 when the length $L_{150}$ of self-similar amplifier SSA was about 7 m, with the best results produced for a 1.0 ps long input pulse P0. FIG. 9A is a plot of the final pulse shape (normalized intensity) as a function of time t (ps) and spectrum for output pulse P3, after applying +19.991 ps/nm chromatic dispersion to compress stretched pulse P2. FIG. 9B is a plot of the final pulse spectrum (normalized magnitude) as a function of frequency (GHz) for output pulse P3.

Note that this amount of chromatic dispersion used for pulse compression is only a tiny fraction less than the −20 ps/nm total chromatic dispersion of a stretcher, which accounts for an additional spectral broadening produced by self-phase modulation in PS fiber 10. As is evident from FIG. 9A, in forming output pulse P3, pulse P2 is compressed to <90 fs width, which is more than 11 times shorter than the original 1.0 ps input pulse P0, with the output pulse having minimum energy transferred to the pulse "wings" or "pedestal."

Figure 10A:
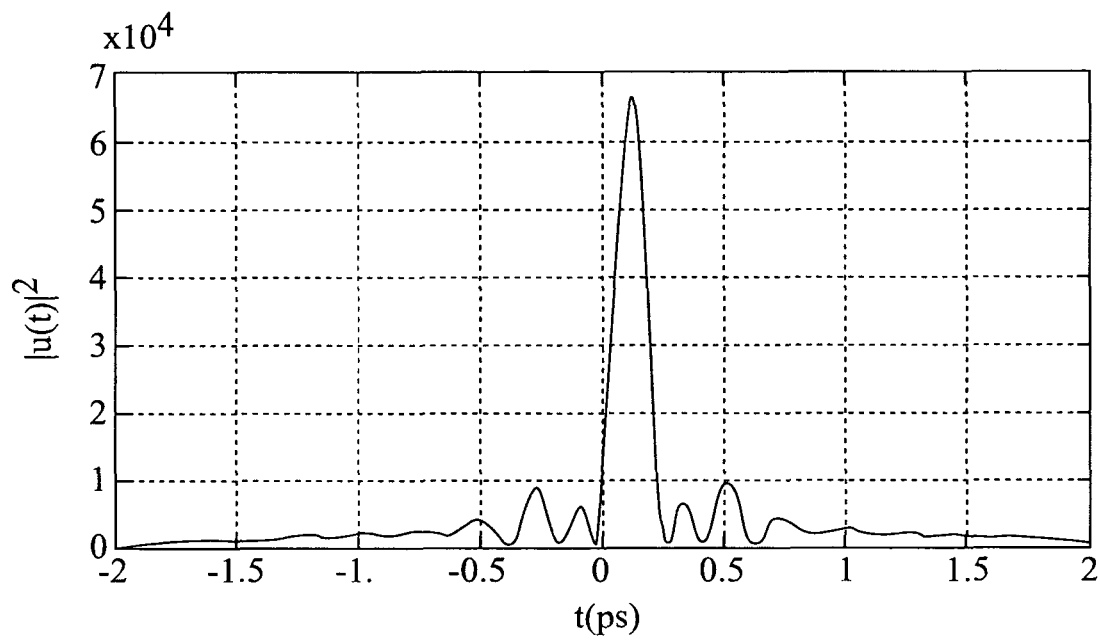
FIGS. 10A and 10B are final pulse shape and final spectrum plots of the output pulse similar to FIGS. 9A and 9B, but for a 2.7 ps long, 185 W peak power Gaussian input pulse (P0), showing noticeably more energy in the "wings" of the corresponding final output pulse (P3)
Figure 10B:
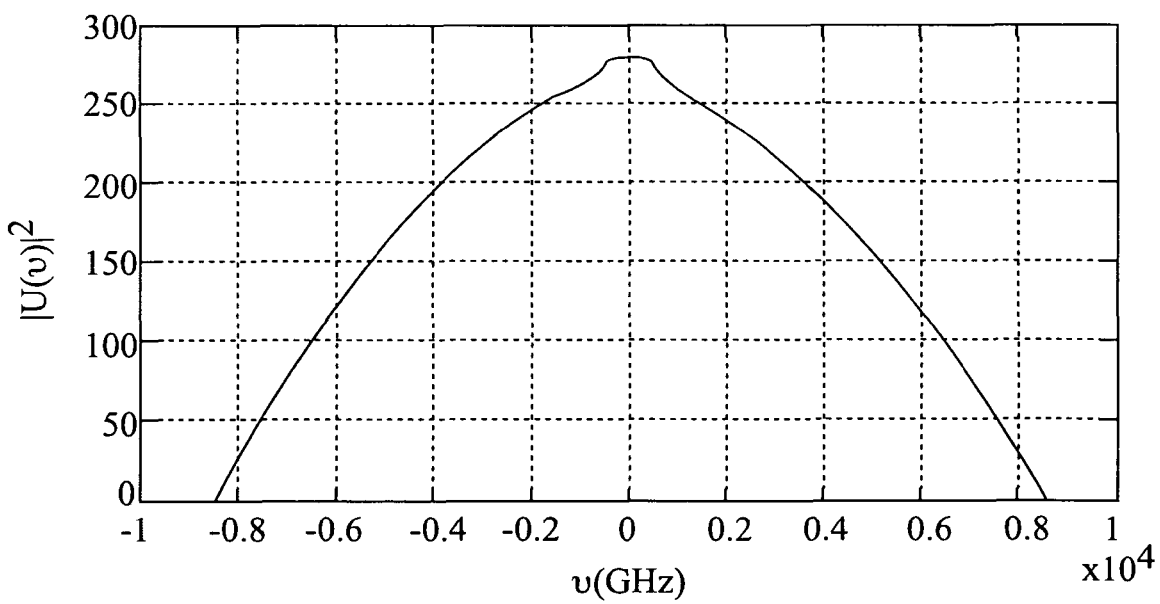

FIGS. 10A and 10B are plots similar to FIGS. 9A and 9B, but for a corresponding result for an input pulse P0 that was a 2.7 ps long, 185 W peak power Gaussian pulse. After amplification and stretching, pulse P2 was compressed to form output pulse P3 having a pulse width of about 125 fs (representing an impressive compression factor of 21.6), but with noticeably more energy in the "wings." This significantly reduces the peak power of the compressed pulses as compared with the pulse of FIG. 9A, but still represents an acceptable pulse quality for practical application. It can be concluded that 2.7 ps represents an upper limit on the pulse width at the input of the self-similar amplifier required for obtaining high-quality pulse output at the end of the system (after compression).

Based on the results of the above-described numerical experiments, a preferred example embodiment of fiber laser system 100 according to the present invention is as shown in FIG. 7A and is modified as shown in FIG. 7B. Laser 104 provides substantially transform-limited input pulses P0 having pulse widths preferably in the range from about 0.1 ps to 5.0 ps, more preferably in the range from 0.1 ps to 3.0 ps, and preferably of about 1.0 ps, and a pulse energy in the range from about 0.1 nJ to about 1.0 nJ, and preferably about 0.5 nJ. In an example embodiment, pulses P0 have only a small amount of chirp and a time-bandwidth product that does not exceed 1.0.

An example laser 104 capable of producing such pulses is a mode-locked fiber laser. Fiber laser system 100 also includes a self-similar amplifier SSA having a doped fiber 150 with normal (negative) chromatic dispersion and an optimum length (as determined numerically as described above or experimentally) as required for the optimum pulse compression by pulse compressor PC that provides minimum pulse shape distortion. In an example embodiment, the length $L_{150}$ of doped fiber 150 for self-similar amplifier SSA is between 2 m and 100 m. In an example embodiment, self-similar amplifier SSA is designed by choosing the fiber length $L_{150}$ and the amount of pump power to produce output pulses P3 having an optimized linear phase change as a function of time.

In an example embodiment, self-similar amplifier SSA has a normal (negative) dispersion of less than −10 ps/nm/km and core effective area $A_{eff}$ in the range defined by 20 μm² $\leq A_{eff} \leq$ 100 μm². Also in an example embodiment, self-similar amplifier SSA has a gain G in the range defined by 6 dB $\leq$ G $\leq$ 23 dB.

In an example embodiment, parabolic pulses PP outputted by self-similar amplifier SSA and inputted into PS fiber 10 have a pulse width larger than 3 ps, and preferably larger than 5 ps, and a pulse energy not exceeding 50 nJ, and preferably not exceeding 20 nJ.

Fiber laser system 100 also includes a pulse compressor PC designed using standard techniques and components B (e.g., bulk diffraction grating pairs) to have a chromatic dispersion sufficient to compress the pulse stretched to a width required for low-nonlinearity power amplification (typically>1 ns) back to its bandwidth-limited width. Pulse stretcher PS includes a length $L_{10}$ of PS fiber 10 so that its total chromatic dispersion and slope are approximately equal and opposite in sign to that of pulse compressor PC.

Fiber laser system 100 also includes a high-power fiber amplifier FA. The chromatic dispersion in pulse compressor PC is fine-adjusted (e.g., by changing the grating separation) to produce optimally amplified and compressed output pulses P3. In an example embodiment, output pulses P3 have a pulse width less than 500 fs, and more preferably less than 100 fs. Also in an example embodiment, output pulses P3 preferably have an energy greater than 10 μJ and more preferably greater than 100 μJ. Also in an example embodiment, output pulses P3 preferably have an average power greater than 10 W and more preferably greater than 100 W.

Fiber Laser with PS Fiber and Stretched Mode-Locked Seed Laser Source

The second approach to minimizing the impact of spectral broadening on the pulse shape of output pulses P3 of fiber laser system 100 is based on using a stretched pulse mode-locked fiber laser as laser 104 in seed laser source SLS. The inventors performed numerical experiments to show that a separate self-similar amplifier SSA is not necessary if substantially linearly chirped input pulses P0 can be produced directly from seed laser source SLS.

Modeling was performed using an input pulse P0 in the form of a substantially transform-limited 100 fs long pulse with 200 kW peak power (corresponding to 20 nJ pulse energy, the same as obtained at the self-similar amplifier output in the numerical experiments described above). Input pulse P0 was substantially linearly chirped to have about a 3 ps duration by applying −0.2 ps/nm chromatic dispersion. This input pulse P0, as in the numerical experiments described above, is passed through PS fiber 10 of length $L_{10}$=200 m, and then compressed by applying +19.752 ps/nm chromatic dispersion.

In an example embodiment, input pulse P0 is chirped such that the phase change with time is substantially linear, and the peak power of the pulse does not exceed 10 kW and more preferably 6.7 kW (20 nJ/3 ps). Also in an example embodiment, input pulse P0 is stretched to >1 ps and preferably to >3 ps, and has an energy that does not exceed 20 nJ.

Figure 11A:
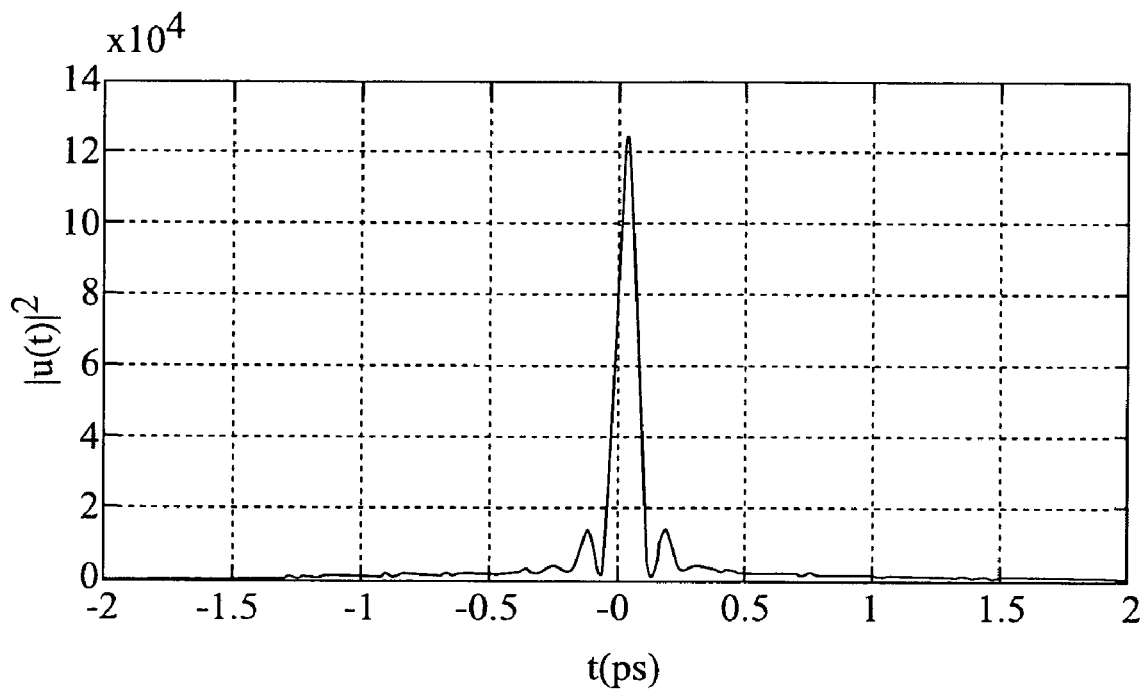
FIGS. 11A and 11B, are final pulse shape and final spectrum plots of the output pulse similar to the plots in FIGS. 9A, B and 10A, B, but for the case where the input to the PS fiber is a transform-limited 100 fs pulse pre-chirped to 3 ps and the output pulse is a high quality ~80 fs long pulse with minimum energy in the wings.
Figure 11B:
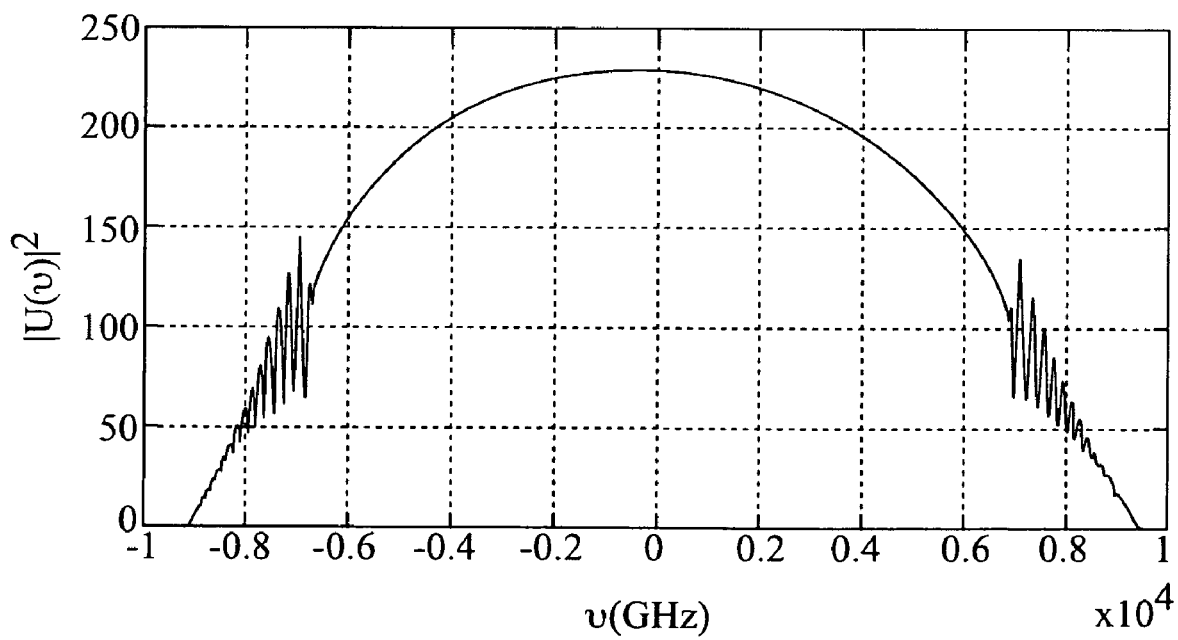

FIGS. 11A and 11B are pulse shape and spectrum plots of the output pulse P3 and are similar to the plots in FIGS. 10A and 10B. The plots of FIGS. 11A and 11B show that output pulse P3 is a high quality ~80 fs long pulse with minimum energy in the wings comparable to the high-quality output pulse shown in FIG. 9A. Even better results can be obtained for lower pulse energies or larger initial chirped pulse widths, which reduce the amount of self-phase modulation in PS fiber 10.

Linearly chirped input pulses P0 can be produced, for example, by stretched-pulse mode-locked fiber lasers. Examples of such lasers are described, for example, in U.S. Pat. Nos. 5,400,350 and 5,513,194 (the '194 patent), which patents are incorporated by reference herein. The '194 patent describes a ring-cavity version of such a laser, wherein the laser includes two segments of fiber, one with positive and one with negative chromatic dispersion, such that the optical pulse is successively stretched and compressed twice in one round trip, once with a positive and once with a negative chirp. The required fiber with positive (anomalous) dispersion in the 1000 nm range can be produced using novel fiber designs such as a photonic crystal (PCF) or all-glass photonic band gap fiber. An output coupler has to be placed in the ring immediately following the normal (negative) dispersion fiber segment, to ensure that the output pulses are negatively chirped.

Other designs for the stretched-pulse mode-locked laser can be used for laser 104. For example, a positive dispersion can be provided by a chirped fiber grating as described in the article by I. Hartl, G. Imeshev, L. Dong, G. C. Cho, M. E. Fermann, entitled "Ultra-compact dispersion compensated femtosecond fiber oscillators and amplifiers," 2005 *Conference on Lasers and Electro-Optics, CLEO*, v 3, p. 1641-1643 (2005), which article is incorporated by reference herein. An essential requirement for stretched-pulse mode-locked fiber laser 104 is sufficient negative dispersion in a part of the cavity to significantly reduce the peak power of the pulse, and a sufficiently linear chirp, such that the input pulse P0 could be compressed to a bandwidth-limited femtosecond duration before entering PS fiber 10 (in the embodiment, the pulse is not compressed and enters the PS fiber 10 in its chirped, reduced peak power condition).

Thus, an example embodiment of fiber laser system 100 is as shown in FIG. 7A and does not require self-similar amplifier SSA and uses a stretched-pulse mode-locked fiber laser 104. Such a laser 104 is preferably configured to provide input pulses P0 having a transform-limited duration of preferably <500 fs and more preferably <100 fs, with a linear chirp resulting in a pulse width of preferably >1 ps and more preferably >3 ps, and with a pulse energy of less than 20 nJ.

It will be apparent to those skilled in the art that various modifications and variations can be made to the present invention without departing from the spirit and scope of the invention. It is thus intended that the present invention cover the modifications and variations of this invention provided they come within the scope of the appended claims and their equivalents.

What is claimed is:

1. A pulse-stretching optical fiber ("PS fiber") for temporally stretching optical pulses, comprising:
   a segmented core having a central core region with a relative refractive index $\Delta_1$, an inner annular core region surrounding the central core region and having a relative refractive index $\Delta_2$ where $\Delta_2<\Delta_1$, and an outer ring region surrounding the inner annular core region and having a relative refractive index $\Delta_3$ wherein $\Delta_3>\Delta_2$;
   a cladding region surrounding the segmented core and having a relative refractive index $\Delta_4$ wherein $\Delta_2<\Delta_4<\Delta_1$, $\Delta_3$; and
   a chromatic dispersion $\leq$−80 ps/nm/km, and a chromatic dispersion slope in the range between −0.1 and 0 ps/nm$^2$/km at a target wavelength $\lambda_T$.

2. The optical fiber of claim 1, wherein the chromatic dispersion is in the range from −125 to −85 ps/nm/km.

3. The optical fiber of claim 1, wherein the target wavelength $\lambda_T$ is in the range 1030 nm$\leq\lambda_T\leq$1100 nm.

4. The optical fiber of claim 1, having an effective area $A_{\it eff}$ in the range 20 $\square^2\leq A_{\it eff}\leq$30 $\square$m$^2$.

5. The optical fiber of claim 1, having a length $L_{10}$ in the range 20 m$\leq L_{10}\leq$2000 m.

6. The optical fiber of claim 5, wherein length $L_{10}$ is such that the PS optical fiber operates to substantially compensate for chromatic dispersion characteristics of a pulse compressor.

7. A fiber laser, comprising:
   a laser configured to provide input pulses having an input pulse width;
   the PS fiber of claim 1 optically coupled to the laser, the PS fiber having a length $L_{10}$ sufficient to temporally stretch the input pulses to form stretched pulses;
   a fiber amplifier optically coupled to the PS fiber and configured to receive and amplify the stretched pulses to form amplified stretched pulses;
   a pulse compressor having dispersion characteristics and optically coupled to the fiber amplifier and configured to compress the amplified stretched pulses to form temporally compressed output pulses based on said dispersion characteristics; and
   wherein the PS fiber length $L_{10}$, the negative chromatic dispersion and the chromatic dispersion slope operate to substantially compensate for the pulse compressor dispersion characteristics.

8. The fiber laser of claim 7, wherein the compressed output pulses have a pulse width $W_O$, the input pulses have a pulse width $W_I$, and wherein $0.05W_I\leq W_O\leq 2W_I$.

9. The fiber laser of claim 7, wherein:
   the input pulses are substantially transform limited and have a pulse width in the range from about 0.1 ps to about 3 ps, and a pulse energy in the range from about 0.1 nJ to 1.0 nJ; and
   the output pulse width is less than 500 fs.

10. The fiber laser of claim 7, wherein the laser is a stretched-pulse mode-locked laser.

11. The fiber laser of claim 10, wherein the laser generates chirped input pulses having a substantially linear phase change with time.

12. The fiber laser of claim 7, wherein the input pulses have a width of between 1 ps and 5 ps.

13. The fiber laser of claim 7, further including a self-similar amplifier disposed between the laser and the PS fiber and configured to form parabolic pulses from the input pulses prior to forming said stretched pulses.

14. The fiber laser of claim 13, wherein the parabolic pulses has a pulse width larger than 3 ps.

15. The fiber laser of claim 13, wherein the parabolic pulses have a linear and negative chirp.

16. The fiber laser of claim 13, wherein the self-similar amplifier includes a length of amplifying optical fiber having normal (negative) dispersion of $\leqq -10$ ps/nm/km.

17. The fiber laser of claim 16, wherein the amplifying optical fiber has a core effective area $A_{\mathit{eff}}$ such that $20\ \mu m \leqq A_{\mathit{eff}} \leqq 100\ \mu m^2$.

18. The fiber laser of claim 13, wherein the self-similar amplifier has a gain G such that 6 dB$\leqq$G$\leqq$23 dB.

19. The fiber laser of claim 7, wherein the laser generates input pulses that are substantially transform limited and that have an energy in the range from 0.1 to 1 nJ.

\* \* \* \* \*